Nov. 7, 1939.　　　　C. E. KRAUS　　　　2,178,589
METHOD OF AND APPARATUS FOR FACE-MILLING
Filed March 4, 1937　　　3 Sheets-Sheet 1

INVENTOR
Charles E. Kraus
By Parker, Carlson, Pitzner & Hubbard
ATTORNEYS

Nov. 7, 1939.  C. E. KRAUS  2,178,589
METHOD OF AND APPARATUS FOR FACE-MILLING
Filed March 4, 1937   3 Sheets-Sheet 2
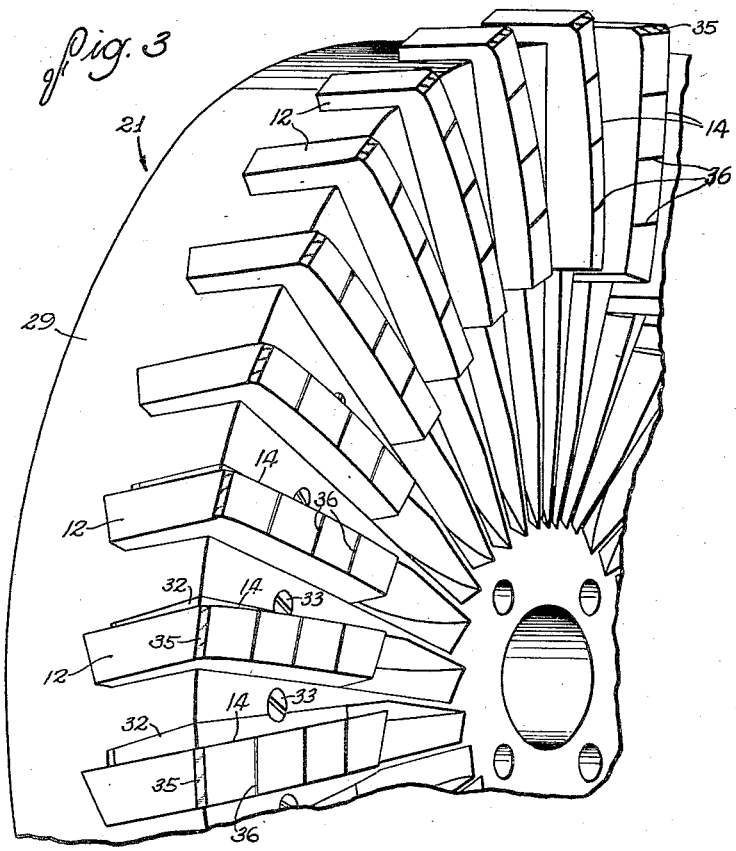
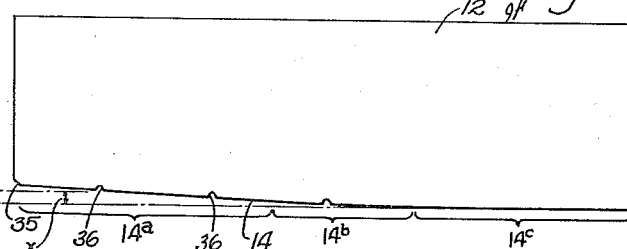
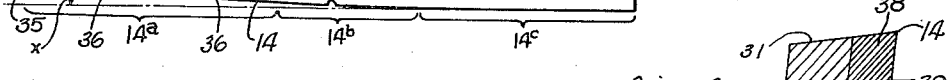
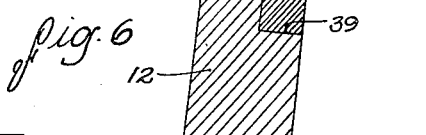
INVENTOR
Charles E. Kraus
By Parker, Carlson, Pitzner & Hubbard
ATTORNEYS Nov. 7, 1939.     C. E. KRAUS     2,178,589
METHOD OF AND APPARATUS FOR FACE-MILLING
Filed March 4, 1937     3 Sheets-Sheet 3
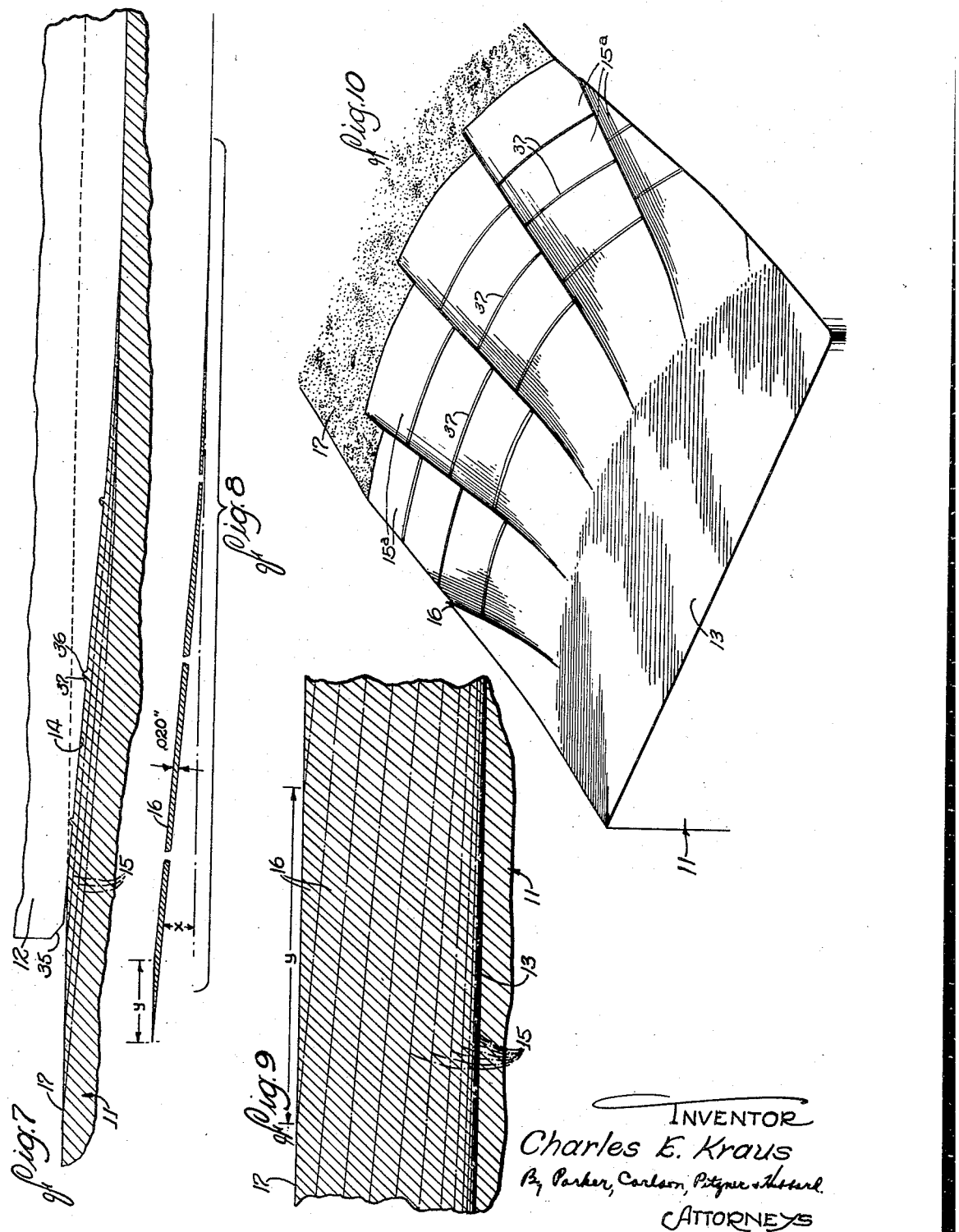
INVENTOR
Charles E. Kraus
ATTORNEYS Patented Nov. 7, 1939

2,178,589

UNITED STATES PATENT OFFICE 2,178,589

METHOD OF AND APPARATUS FOR FACE-MILLING

Charles E. Kraus, Rockford, Ill., assignor to The Ingersoll Milling Machine Company, Rockford, Ill., a corporation of Illinois Application March 4, 1937, Serial No. 129,020

13 Claims. (Cl. 90—18)

This invention relates to the removal of a layer of metal stock from a work piece to form a continuous plane surface thereon by means of a multiple blade rotary cutter while the work and cutter are being relatively fed longitudinally of the surface to be produced. In face-milling as now generally practiced, the active edges of the cutter are so shaped and positioned that the chip thickness is measured in the general direction of feed between the cutter and the work and therefore varies in direct proportion to the rate of feed. Since the burden on the cutter depends on the thickness of the chips removed, a fixed limitation is imposed upon the feed rate and therefore upon the maximum rate at which metal may be removed.

The general object of the present invention is to provide a novel method of and apparatus for face-milling in which the direct relation above referred to is so changed that the rate of feed influences thickness of the chips removed to such a small degree by the rate of feed that the latter may be increased many times as compared to ordinary practice without imposing an additional burden upon the cutter.

Another object is to provide a new and improved method of and apparatus for face-milling which is especially adapted for finishing operations and which utilizes cutting elements that may be manufactured at a low cost and sharpened conveniently.

The invention also resides in the novel construction of the cutter and the blades thereof.

Other objects and advantages of the invention will become apparent from the following detailed description of the invention taken in connection with the accompanying drawings, in which Figure 1 is a perspective view, partially in section, showing the elements of a typical milling machine in which the present invention may be practiced.

Fig. 3 is a fragmentary perspective view of the cutter.

Fig. 4 is an approximate actual size elevational view of one of the cutter blades.

Fig. 5 is an enlarged fragmentary elevational view of a portion of a modified form of cutter.

Fig. 6 is a sectional view taken along the line 6—6 of Fig. 5.

Fig. 7 is a fragmentary cross sectional view of a partially machined work piece showing one of the cutter blades in elevation.

Fig. 8 is an enlarged cross sectional view of one of the slices of metal formed in the present process.

Fig. 9 is a substantially enlarged cross sectional view of a longitudinal zone of the work piece showing the lines along which the different slices of metal are removed from such zone.

Fig. 10 is a fragmentary perspective view of a partially machined work piece.

Figure 1:
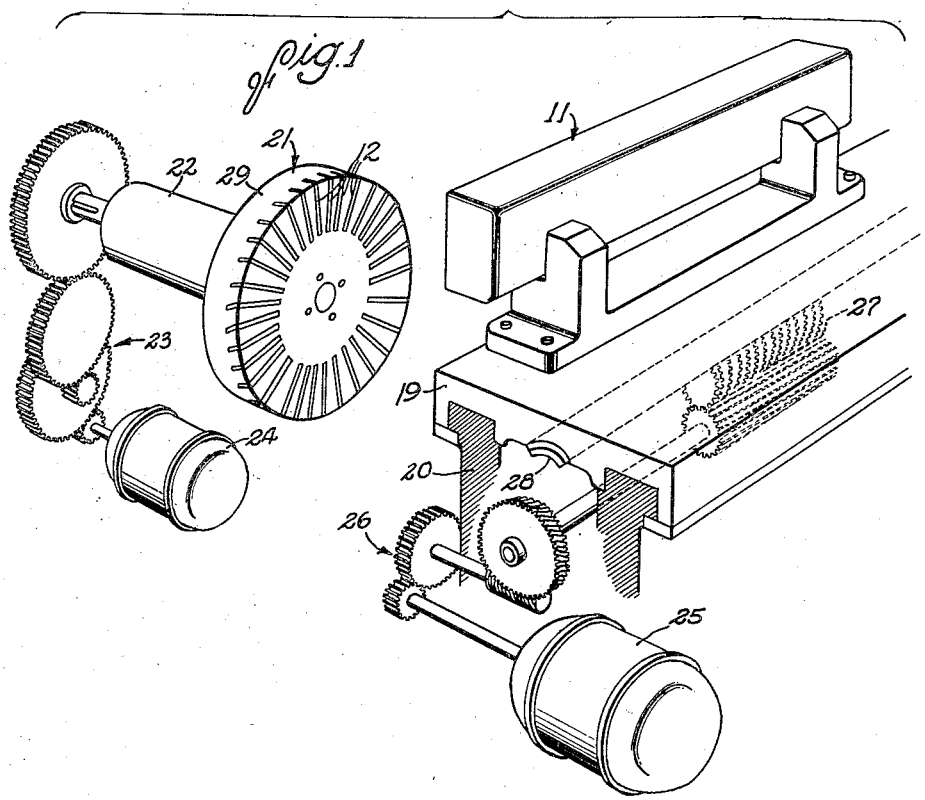

While the invention is susceptible of various modifications, I have illustrated in the drawings and will herein describe in detail the preferred embodiment and method of practicing the invention. It is to be understood, however, that I do not intend to limit the invention by such disclosure but aim to cover all modifications and alternative methods and constructions falling within the spirit and scope of the invention as expressed in the appended claims.

Generally stated, the improved method comprises revolving a series of radially extending cutting edges about an axis normal to the surface to be produced and simultaneously feeding the edges and a work piece longitudinally of the said surface and, in the course of such movements, cutting off from the work piece successive extremely thin slices of metal having a width several times as great as the thickness of stock to be removed and extending diagonally from the rough work surface to the finished surface at such a small angle that the thickness of each slice is only a small part of the feeding movement per cutting edge. Any desired thickness of metal stock may thus be removed from a work piece at a rate of feed per edge many times as great as the maximum permissible thickness of the slices which is determined by the cutting material used.

To facilitate the formation of a smooth finish on the final surface, the inclination of each cutting edge decreases progressively in approaching the final work surfaces and finally merges with a substantially straight inner end portion of the edge which coincides with the plane of the final surface.

As applied in the face-milling of a work piece 11, blades 12 are arranged to revolve about an axis perpendicular to the finished work surface 13 and have cutting edges 14 shaped so that during the feeding movement, the edges of successive blades move in arcuate paths along cutting lines 15 to cut-off wide thin slices 16 of metal leaving surfaces 15ᵃ on the work. Each slice is several inches in width extending from the rough work surface 17 to a point adjacent the finished surface 13 at a small angle $x$ and finally tapering gradually and progressively to coincidence with the finished surface. Thus, the inclination and thickness of successive slices 16 removed from any one longitudinal zone of the work decrease progressively in approaching the finished surface as illustrated in Fig. 9.

The maximum thickness of each slice is, of course, determined by the cutting material used, preferably being less than .020 of an inch for roughing operations when the cutting edges are composed of high speed steel. In spite of the thinness of each slice, a substantial volume of metal is removed by each cutting edge due to its substantial width. Because of this, coupled with the fact that the maximum chip thickness is only a small proportion of the feed per blade indicated at $y$, metal may be removed from the work at a rate several times as great as in face-milling as ordinarily practiced and at the same time a smooth and accurate finish is obtained.

The method above described may be carried out in various machines. In the typical milling machine shown, the work piece 11 is secured by suitable clamps upon a support in the form of a table 19 on a bed 20 so as to move the work across the face of a rotary cutter head 21 carrying the blades 12. The head is fast on a spindle 22 which may be journaled in suitable bearings disposed close to the cutter so as to support the latter with the proper rigidity. The spindle is driven through suitable gearing 23 by power derived from an appropriate source such as an electric motor 24.

Relative feeding movement between the cutter head and the work at the proper rate may be effected and controlled in various ways well understood in the art. In the present instance, the table 19 is arranged to be reciprocated by power derived from a reversible electric motor 25 and transmitted through suitable speed-reducing mechanism including gearing 26 and a screw 27 meshing with a rack 28 on the table.

Figure 2:
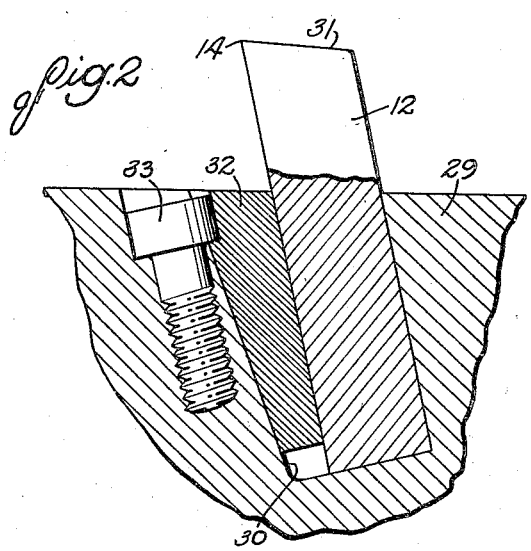
Fig. 2 is a fragmentary cross sectional view through one of the cutter blades and its mounting.

As shown in Figs. 2 and 3, the cutter 21 comprises a generally cylindrical body 29 having relatively closely spaced slots 30 in one face extending radially or substantially so and inclined so as to provide the rake angle desired. The slots are spaced uniformly around the cutter face and receive the blades 12 each of which is positioned with one side portion projecting from the face of the body. Herein each blade comprises a generally rectangular block of cutting material having an elongated cutting edge 14 formed along the leading edge of an exposed surface 31 which is sloped away from the cutting edge to afford proper clearance.

The blades may be locked in the cutter head in various ways. In the present instance, each is clamped against the bottom and one side wall of the slot by an inwardly tapering wedge 32 received between the blade and the opposite wall of the slot and held in wedged position by a screw 33 threading into the body with its head overlying the wedge.

For the purpose of removing the metal in slices of the character above described, the cutting edge 14 of each blade has a length of several inches depending on the thickness of the slices and the total depth of metal to be removed and is divided longitudinally into outer, intermediate, and inner portions 14$^a$, 14$^b$, and 14$^c$ (Fig. 4). In the face-milling cutter shown, the inner end portion 14$^c$ by which finishing is effected is disposed in a plane perpendicular to the rotational axis of the cutter head and has a length substantially greater than the maximum feeding movement per blade. Preferably, though not necessarily, the outer portion 14$^a$ is substantially straight and is disposed relative to the portion 14$^c$ at an angle $x$ of a few degrees depending on the maximum feed rate desired and the allowable thickness of the chips. In the present instance, the angle $x$ is approximately five degrees, the blade being adapted for removal of a quarter of an inch of stock at a feed $y$ of approximately a quarter of an inch per blade and with a maximum chip thickness of .020 of an inch. The intermediate edge portion 14$^b$ merges with the portions 14$^a$ and 14$^c$ and its slope decreases gradually to provide for tapering of the chip progressively toward the finished work surface.

The lengths of the portions 14$^a$ and 14$^b$ are determined by the selected angle $x$ and the amount of stock to be removed, being such that the overall axial height of the cutting edge 14 is greater than the maximum thickness of stock to be removed. Thus, the edge portion 14$^a$ always intersects the rough work surface 17 regardless of variations in the contour of the latter. In accordance with regular practice, the extreme outer end of the blade may be formed with a short beveled edge 35.

From the foregoing, it will be observed that the cutting edges 14 on all of the blades on the cutter head coact to form an axially facing cutting face of slightly coned shape or of generally convex curvature with the outer end portions 14$^a$ of the blade edges constituting elements of a conical frustum and with the innermost portions of the edges gradually merging into a common plane perpendicular to the cutter axis.

The cutter above described may be used for fine finishing operations as well as for ordinary roughing and finishing in one operation. This is made possible by virtue of the very gradual curving of the intermediate edge portion 14$^b$ and final mergence thereof with the finishing portion 14$^c$. Thus, the cutter is especially adapted for taking finishing cuts of a few thousandths of an inch or for removing any thickness of stock up to the maximum overall axial height of the cutting face which, in this instance, is approximately one-eighth of an inch.

For the purpose of preventing the development of objectionable vibration especially in the facing of steel work pieces, the continuity of each cutting edge 14 is preferably interrupted at spaced points along its length by forming notches 36 in the blades 12. The notches on adjacent blades may be staggered or otherwise so arranged that the ridges 37 formed on the work surfaces 15$^a$ by adjacent blades will be spaced apart as shown in Fig. 10. By notching the cutting edges, each of the slices of metal formed thereby will be interrupted at spaced points as shown in Fig. 8.

The rate at which the cutter head and the work are fed relative to each other is, of course, determined by the maximum inclination of the cutting edge 14 relative to the work surface to be produced and the maximum permissible thickness of the chips, the latter in turn being governed by the kind of cutting material employed. For example, with the cutter blades constructed as described and assuming that the chip thickness is not to exceed .020 of an inch, which has been found to be desirable in the case of roughing operations using high speed steel, the maximum feeding movement should not exceed approximately one-fourth of an inch per tooth or seven and one-half inches per revolution for thirty-tooth cutter. Thus, the maximum chip thickness is only a small fraction, about one tenth in the present instance, of the feeding movement per cutter tooth. Also, it should be noted that the width of the individual slice 16 of metal is many times as great as the total thickness of the layer of stock to be removed from the work. It has been found that cutting edges having lengths of five inches or more may be employed.

The machine above described is adapted to face mill surfaces of any width less than the diameter of the circle formed by the innermost end portions 14c of the blades. Preparatory to the machining operation, the work pieces are mounted on the work support or table with the plane of the innermost portions 14c coinciding with the plane of the finished work surface 13 to be produced, the plane of the highest point on the rough work surface 17 intersecting the outer portions 14a of the cutting edges. During the combined rotary and feed movements between the work and the cutter with the work thus positioned, the successive edges 14 are moved transversely across the work along arcuate paths as shown in Fig. 10, each cutting off a slice 16 of metal of the shape shown in Fig. 8 after the cutter has progressed into the work a sufficient distance for the cutting edges 14c to become effective in forming the finished surface 13.

As the contour of the rough work surface 17 varies, different portions of the cutting edge portions 14a will be active in cutting through the hard surface layer or scale on the casting. Even though this scale is relatively thin, the portions of the cutting edges which are required to cut it are subjected to a somewhat greater burden than the remaining portion of the edges. Also, by being disposed at larger radii, the outer portions of the cutting edges operate at a substantially greater speed than the inner portions and therefore are subject to greater wear. The invention contemplates the provision of means for increasing the resistance of these outer edge portions to wear whereby to equalize the service life of the different portions of the edges. In the present instance, this is accomplished by setting a block 38 of more resistant cutting material such, for example, as tungsten carbide into a recess 39 in the outer end of the blade and sharpened to an edge constituting a part of the cutting edge 14. The block may be fastened in place by brazing and its length corresponds approximately to the normal variations in the contour of the rough surface on the work piece to be machined.

I claim as my invention:

1. A machine for removing metal from a work piece to form a plane surface thereon comprising, in combination, a rotary cutter head having a series of angularly spaced and radially extending cutting blades projecting from one end thereof and each having an inner end portion disposed in a plane perpendicular to the axis of said head and an outer portion inclined at a small angle to said plane, means for rotating said cutter head, means for supporting a piece of work with the plane of the rough work surface intersecting said outer edge portions and with the plane of said inner edge portions coinciding with the finished surface to be produced, and means for causing relative feeding movement between said cutter and a piece of work longitudinally of said finished surface at a continuous rate to effect removal of metal from the work piece in a succession of wide thin slices extending transversely of the direction of feed with one side edge terminating at the rough work surface and the opposite side edge tapering to convergence with the finished surface.

2. A machine for removing metal from a work piece to form a plane surface thereon comprising, in combination, a rotary cutter head having a series of angularly spaced and radially extending cutting blades projecting from one end of the head and each having an edge the outer portion of which constitutes an element of a conical frustum having a small slope, the intermediate portions of each edge merging with the inner end portion which is disposed in a plane perpendicular to the axis of said head, means for rotating said cutter head, means for supporting a piece of work with the plane of the rough work surface intersecting said outer edge portions and the plane of said inner edge portions coinciding with the finished surface to be produced, and means for causing relative feeding movement between said cutter head and the piece of work longitudinally of said finished surface at a continuous rate and in a direction to cause engagement of the work and said edges along a path disposed within the circle described by said inner end portions.

3. A machine for removing metal from a work piece to form a plane surface thereon comprising, in combination, a power rotated cutter head having a series of radially extending cutting edges projecting from one end thereof and each having an inner portion disposed in a plane perpendicular to the axis of the head and an outer portion extendng at a small angle relative to and gradually merging with said inner portion, the radial length of each cutting edge being substantially greater than the effective axial height of said outer portion, means for supporting a work piece with the plane of said inner edge portions coinciding with the surface to be produced, and means for causing relative feeding movement between the cutter head while rotating and the work piece in a direction longitudinally of said finished surface at a continuous rate to effect removal of metal by the successive blades in thin slices extending diagonally from the rough work surface and tapering to coincidence with said finished surface.

4. A machine for removing metal from a work piece to form a plane surface thereon comprising, in combination, a rotary cutter head having a series of angularly spaced and radially extending blades with elongated cutting edges coacting to form a cutting face having an outer portion of generally frusto-conical contour merging with an inner portion disposed in a plane perpendicular to the axis of said head, means for rotating said cutter head, means for supporting a piece of work with the plane of the rough work surface intersecting the outer portion of said face and said plane coinciding with the finished surface to be produced, and means for causing relative feeding movement between said cutter head and the work piece longitudinally of said finished surface at a continuous rate, the inclination of said outer portions of the cutter face being such that the maximum thickness of the slice of metal cut by each of said blades is substantially less than the feeding movement per cutter blade.

5. A face-milling machine for removing metal from a work piece to form a continuous plane surface thereon comprising, in combination, a power rotated cutter head having a series of angularly spaced radially extending cutting edges projecting from one axial face thereof, and means for causing relative feeding movement between said cutter head and a work piece in a direction perpendicular to the rotational axis of said head, each of said cutting edges being shaped to remove from the work piece a thin slice of metal intersecting the rough work surface at a small angle and having a maximum thickness of only a fraction of the feeding movement per cutting edge.

6. A face-milling machine for removing metal from a work piece to form a continuous plane surface thereon comprising, in combination, a power rotated cutter head, means for supporting a work piece to be machined with the plane of the surface to be produced disposed at right angles to the rotational axis of said head, means for causing relative feeding movement between the cutter head while rotating and the work piece in a direction longitudinally of said finished surface and at a continuous rate, and a series of annularly spaced radially extending blades on the rotating head operable during such feeding movement to effect removal of metal in thin slices extending at a small angle from the rough work surface to said finished surface and gradually tapering to coincidence with the finished surface.

7. A machine for face-milling a work piece comprising, in combination, a power rotated cutter head, means for supporting a work piece with the plane of the surface to be produced disposed at right angles to the rotational axis of said head, means for causing relative feeding movement between the cutter head while rotating and the work piece in a direction longitudinally of said finished surface and at a continuous rate, and a series of elongated cutting edges on said rotating head movable successively across the work in arcuate paths to effect removal of metal from each longitudinal zone of the work in a succession of thin slices intersecting the rough work surface at a small angle and progressively decreasing in slope and thickness in approaching the final work surface.

8. The method of face-milling a work piece to form a plane surface thereon, which comprises revolving a series of radially extending cutting edges with their outer portions lying approximately on the periphery of a conical frustum having a slope of a few degrees and with the inner portions of the edges progressively approaching and terminating in a plane perpendicular to the axis of revolution, and relatively feeding said revolving edges and a work piece longitudinally of the finished surface to be produced with said plane coinciding with said surface.

9. The method of face-milling a work piece to form a plane surface thereon which comprises relatively feeding the work and a series of cutting edges in a direction longitudinally of said surface, revolving said edges about an axis passing through the work, and during such feed, removing all of the metal in the path of said series of edges down to the plane of the final finished surface by successively cutting off thin slices of metal each tapering at one edge to coincidence with the plane of said surface and intersecting the rough work surface at such a small angle that the maximum thickness of the metal slice is only a small fraction of the feeding movement per cutting edge.

10. The method of face-milling which comprises relatively feeding the work and a series of cutting edges longitudinally of the work surface to be produced and during such feeding revolving said edges about an axis perpendicular to said surface to remove all metal in the path of said edges down to the final finished surface by cutting off successive thin slices of metal each having a maximum thickness less than one tenth of the feeding movement per cutting edge and tapering at one edge to a point of intersection with the rough work surface and at the opposite edge to coincidence with said finished surface.

11. A face-milling cutter for removing metal to form a plane surface by relative feeding movement between a work piece and the cutter in a direction parallel to said surface, said cutter comprising, in combination, a rotatable body, a plurality of generally radially extending blades circumferentially spaced around an end face of said body and having elongated cutting edges coacting to form a cutting face of generally frustoconical shape with an inner edge portion disposed in a plane perpendicular to the axis of said body.

12. A face-milling cutter for removing metal to form a plane surface by relative feeding movement between a work piece and the cutter in a direction parallel to said surface, said cutter comprising, in combination, a rotatable body, a plurality of generally radially extending blades circumferentially spaced around an end face of said body and having elongated cutting edges coacting to form a cutting face having an annular outer portion of generally convex contour and of substantially greater radial width than axial height and an inner annular portion of a diameter greater than the width of the work piece to be surfaced and disposed in a plane perpendicular to the axis of said body.

13. A rotary cutter for removing metal to form a continuous plane surface by relative feeding movement between a work piece and the cutter in a direction parallel to said surface, said cutter comprising, in combination, a rotatable body, a plurality of elongated blades circumferentially spaced around said body and having elongated cutting edges acting to form a cutting face, one portion extending parallel to the surface to be formed and a second portion extending at a small angle to said first mentioned portion for intersecting the rough work surface, a substantial length of said last mentioned portion being composed of cutting material of greater wear resistance than the remainder of the cutting edge.

CHARLES E. KRAUS.